A. L. KINS.
TURNING MECHANISM FOR TRACTORS AND THE LIKE.
APPLICATION FILED AUG. 18, 1919.

1,388,579.

Patented Aug. 23, 1921.
2 SHEETS—SHEET 1.

Inventor
Albert L. Kins
by John J. Miller
Geo. J. Henry
Attorneys

A. L. KINS.
TURNING MECHANISM FOR TRACTORS AND THE LIKE.
APPLICATION FILED AUG. 18, 1919.

1,388,579.

Patented Aug. 23, 1921.

UNITED STATES PATENT OFFICE.

ALBERT L. KINS, OF FARMINGTON, CALIFORNIA.

TURNING MECHANISM FOR TRACTORS AND THE LIKE.

1,388,579.  Specification of Letters Patent.  Patented Aug. 23, 1921.

Application filed August 18, 1919. Serial No. 318,089.

*To all whom it may concern:*

Be it known that I, ALBERT L. KINS, a citizen of the United States, and resident of Farmington, county of San Joaquin, State of California, have invented new and useful Improvements in Turning Mechanisms for Tractors and the like, of which the following is a specification.

The principal objects of my invention are to secure the simple and easy turning of the tractor especially while driving.

This I accomplish by utilizing portions of the differential gear driver of the motor driven vehicle as driving means to cause an additional turning effort on one or the other driving wheels to thereby cause it to advance relatively to the other driver. This will cause the turning of the machine.

By referring to the accompanying drawings my invention will be made clear.

Figure 1:
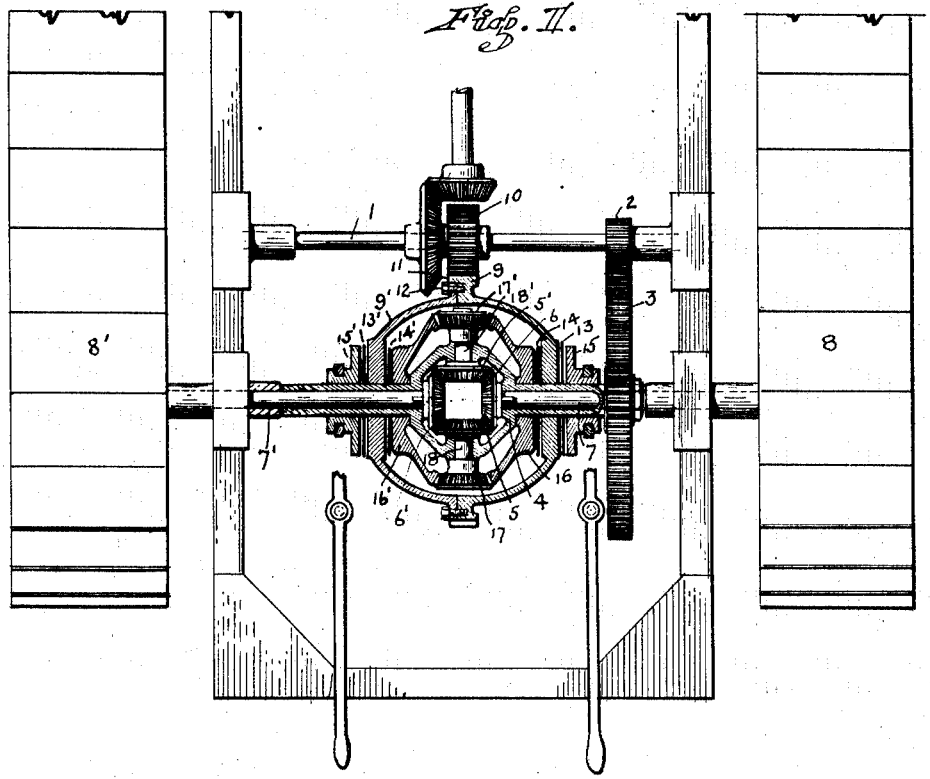
Figure 1 is a cross section through the driving shaft and differential gear containing my invention.
Figure 2:
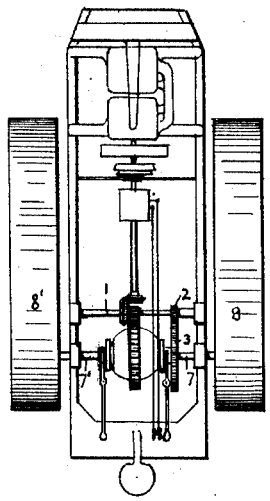
Fig. 2 is a plan view of the parts in Fig. 1 and with the assembled tractor wheels, to a reduced scale.
Figure 4:
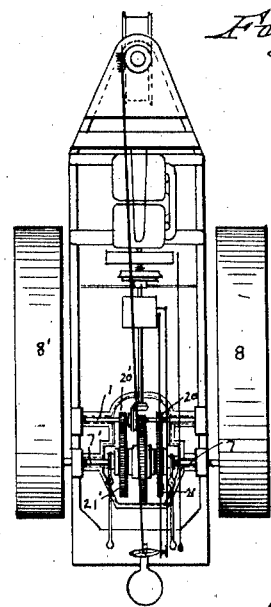
Fig. 4 is a plan view of the parts of Fig. 3 to a reduced scale, assembled.

In the figures the same numerals refer to the same parts. The transmission shaft is represented by the numeral 1 on which is mounted the pinion 2 which transmits the driving power through the gear 3 sleeve 4 and bevel pinions 5, 5', to the bevel gears 6, 6', mounted respectively on the tractor axles 7, 7'. It will be seen that on straight ahead driving the axles 7, 7' will rotate together; the gears 5, 5' and 6 6' being fixed with respect to each other and the entire combination of the said four gears rotating about the axis 7, 7' so that the driving shaft 1 is driving the tractor on members 8 8', preferably of the well known track laying type.

The differential driver permits relative movement of the shafts 7 and 7' at which time the gears 5 and 5' are rotated about the gears 6 and 6' and is well known in the art and needs no further description.

It will be observed that the driving effort is equally exerted on each of the shafts 7 and 7' which may be said to be in equilibrium about the axis passing through the center of the gears 5, 5'.

Referring now to Fig. 1, the numeral 9, 9' represents a secondary gear in mesh with the pinion 10, the latter of greater diameter than pinion 2 and fixed to the drive shaft 1; 9, 9' is preferably formed as a gear housing for the differential gears collared about the sleeve 4.

During normal driving the housing 9 will rotate faster than the collar 4; the gear housing 9, 9' is preferably made in two parts assembled concentrically about the recess 11 and held together with screws as at 12. The circular portions at 13, 13' and 14, 14' are faced off to receive friction disks between corresponding faced clutch members 15, 15' and the hubs of the gears 16, 16'. These gears 16 and 16' are rotatable on the sleeves 4, 4', and are in mesh with the pinions 17, 17'; which are fixed to the spindles 18, 18', in turn fixed to the pinions 5, 5'.

The operation will be as follows: It will be seen that on straight driving, gears 16, 16' rotate synchronously with the collars 4, 4' and gears 6, 6' and shafts 7, 7'. However if 16 be engaged with 9 by the engagement of the clutch 15 through the operating lever forcing the disk 15 and with it the friction face of 9 against said gear 16, the faster rate of travel of 9 will be imparted to the gear 16 which will then advance with respect to the gear 16', causing the rotation of gears 17, 17' spindles 18 18' gears 5 and 5' and carrying therewith gear 6, axle 7, which will correspondingly advance with respect to gear 6' and axle 7'. This will cause the traction member 8 to advance with respect to 8' and the tractor to turn during its driving.

The clutching of 15' gear 16' will advance axle 7' with respect to axle 7 thus causing a turning of the tractor in the opposite direction during driving.

Figure 3:
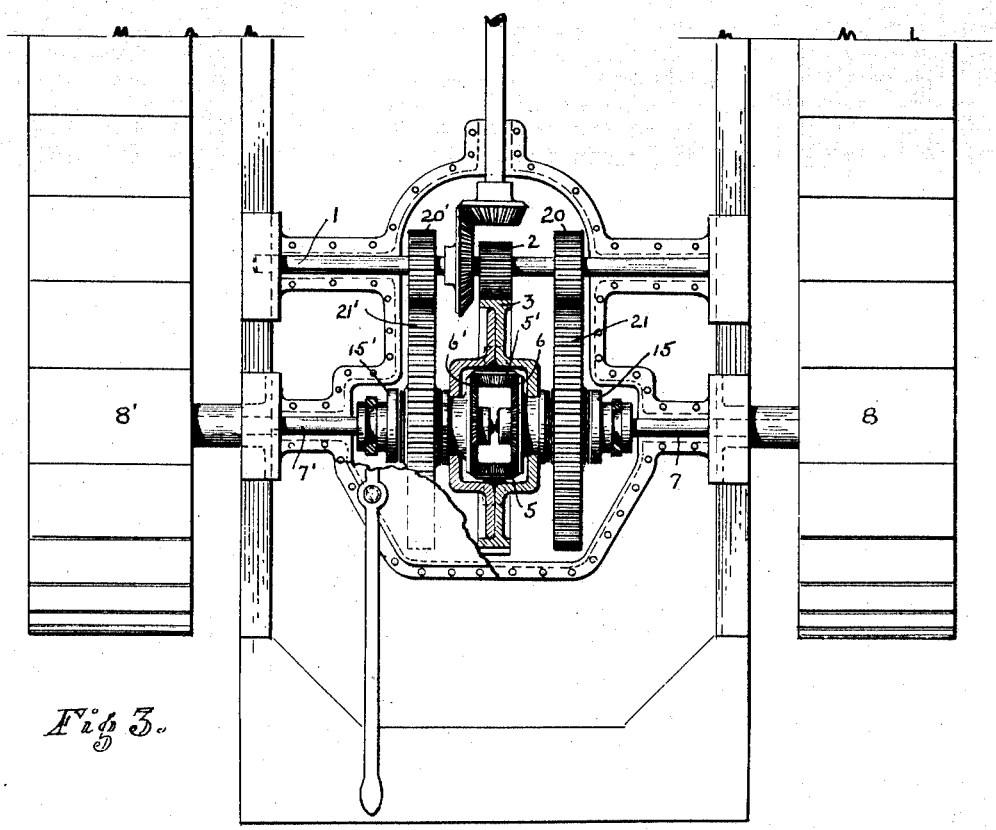
Fig. 3 is a cross section of another form of differential gear containing my invention.

In Fig. 3 is shown a variation of construction employing my invention, wherein the pinions 20, 20' are larger than pinion 2 and are in engagement with the gears 21 and 21' which will then rotate faster than the gear 3. If now gear 21 or 21' be engaged by the clutch 15 or 15' respectively with gear 6 or 6', axle 7 will be advanced with respect to 7' or vice versa—turning the tractor one way or the other during driving.

It will be obvious that instead of mounting the clutches 15 and 15' on axles 7 and 7' the gears 21 and 21' may be rigidly fixed on said axle and the pinions 20—20' mounted loosely on the shaft 1 with clutches thereon so that either 20 or 20' may be constrained to rotate with shaft 1 upon engagement of its respective clutch. I desire to be understood as claiming such variation in the construction and any others by which my invention may be practised.

Reference is herein made to my copending application Serial 286,437 filed Mar. 31, 1919.

I claim:

1. In driving mechanism for motor propelled vehicles a pair of alined axles, a pair of gears loosely mounted on a sleeve, said sleeve carried on both axles, a driving member having a hub extension rotatable about said sleeve, independently operable clutch means between each of said hub extensions and said gears, said driving member inclosing differential pinions interiorly disposed and engaging both of said gears and carried by a central frame connecting said sleeves and each of said pinions having a shaft and another pinion, the last named pinion engaging two opposite faced pinions which are mounted one on each of said axles, and means constructed and adapted to drive the sleeve at a different rate from the driving member.

2. In gear driving mechanism for motor propelled vehicles a pair of axles alined with each other and differential gear mechanism disposed therebetween and driving means for said differential gear, a sleeve mounted on each of said axles and gear mechanism between said driving means and said sleeves whereby the sleeves are normally driven at a faster rate than said differential, and clutch means independently operable between each of said sleeves and its corresponding axle.

In testimony whereof, I have hereunto set my hand at city and county of San Francisco, State of California, this 24 day of July, 1919.

ALBERT L. KINS.